United States Patent

[11] 3,625,569

[72] Inventors: Sheldon Little
Atlanta;
Orval L. Braunbeck, Jonesboro, both of Ga.
[21] Appl. No. 12,570
[22] Filed Feb. 19, 1970
[45] Patented Dec. 7, 1971
[73] Assignee Sheldon Little Company
Atlanta, Ga.

[54] PNEUMATIC CONVEYOR
8 Claims, 4 Drawing Figs.

[52] U.S. Cl. .................................................. 302/2 R
[51] Int. Cl. ................................................ B65g 53/00
[50] Field of Search ...................................... 302/2 R, 22, 23, 17, 64

[56] References Cited
UNITED STATES PATENTS
588,518   8/1897   Weber ......................... 302/23
824,585   6/1906   Rieth et al. ................. 302/23
1,597,438 8/1926   Ennis .......................... 302/64

*Primary Examiner*—Richard E. Aegerter
*Attorney*—Jones & Thomas

ABSTRACT: A pneumatic conveyor for moving bottle caps or crowns from a large storage bin to a bottle-capping apparatus in a bottling line. An airflow stream is created from the crown storage bin to carry crowns to and fill a first accumulation chamber, the flow stream is terminated, the crowns in the first accumulation chamber are transferred to a second accumulation chamber, and the flow stream from the storage bin to the first accumulation chamber is reestablished. A continuous airstream is maintained from the second accumulation chamber to the supply hopper of a crown dispenser in a bottling line and the crowns intermittently accumulated in the second accumulation chamber are transported in the continuous airstream to the supply hopper. A major portion of the airstream is separated from the crowns as the crowns approach the supply hopper so as to decelerate the crowns as they approach the supply hopper. The intermittent operation of the airstream between the crown storage bin and the first accumulation chamber functions in response to the quantity of crowns present in the supply hopper for crown dispenser.

3,625,569

PNEUMATIC CONVEYOR

BACKGROUND OF THE INVENTION

In a typical bottling plant where beverages and similar commodities are bottled, such as soft drinks, beer, or virtually any liquid substance, a plurality of bottles, cans or other containers are usually placed on a conveyor line, moved through the various stations, and subsequently to a capping station. The machinery utilized to perform the various bottling functions is sophisticated and substantially entirely automated in the more modern bottling plants.

The crowns or bottle caps used to close the bottles are usually manufactured by a crown manufacturer at a location remote from the bottling company, and the crowns are usually packaged in containers that hold approximately 60 gross of the crowns and weigh approximately 60 pounds. The containers are sized so that they can be handled conveniently by the workmen at the bottling company and at the crown manufacturing plant, since the containers must be stored at the bottling company and moved from a remote storage location to a bottle cap dispenser at the conveyor line of the bottling apparatus. The workmen normally must check the supply of crowns in the bottle cap dispenser and carry the crown container to the bottle cap dispenser and pour the crowns out of the container into a relatively small crown hopper. If the crown containers were larger in size, they would be too heavy and cumbersome for the workmen to carry and manipulate. Moreover, since the crown hopper must contain a continuous supply of crowns to feed the bottling conveyor, the workmen must be able to retrieve a crown container and fill the crown hopper on short notice.

SUMMARY OF THE INVENTION

Briefly described, the present invention comprises a pneumatic conveyor system for automatically transferring bottle crowns from large and remote crown storage bins to a bottling conveyor line when the crown dispenser at the conveyor line calls for more crowns. The crown storage bins do not have to be moved once they are delivered by the crown manufacturer and a workman merely connects the inlet conduit of the pneumatic conveyor to a large storage bin to supply the bottling line with crowns. When the crown hopper at the capping station of the bottling conveyor calls for crowns, a first airstream is created through a conduit from the crown storage bin to the first accumulation chamber, where a predetermined quantity of the crowns are accumulated. The first airstream is then terminated and the crowns are transferred to a second accumulation chamber. The crowns are ultimately transferred from the second accumulation chamber into a second continuous airstream and flowed toward the crown hopper.

Thus, it is an object of this invention to provide a pneumatic conveyor for automatically carrying bottle crowns from a remote storage location to the capping station at a conveyor line.

Another object of this invention is to provide a means for continually supplying bottle crowns to a crown hopper at a bottling conveyor in response to an indication of low supply at the crown hopper.

Another object of this invention is to provide a system for transporting bottle crowns in response to a call for crowns at a delivery station, which functions automatically, which is reliable, which functions without damaging the crowns, and delivers the crowns to the bottling conveyor line in a clean and sanitary condition.

Other objects, features and advantages of the present invention will become apparent upon reading the following specification, when taken in conjunction with the accompanying drawing.

DESCRIPTION OF THE PREFERRED EMBODIMENTS

Figure 1:
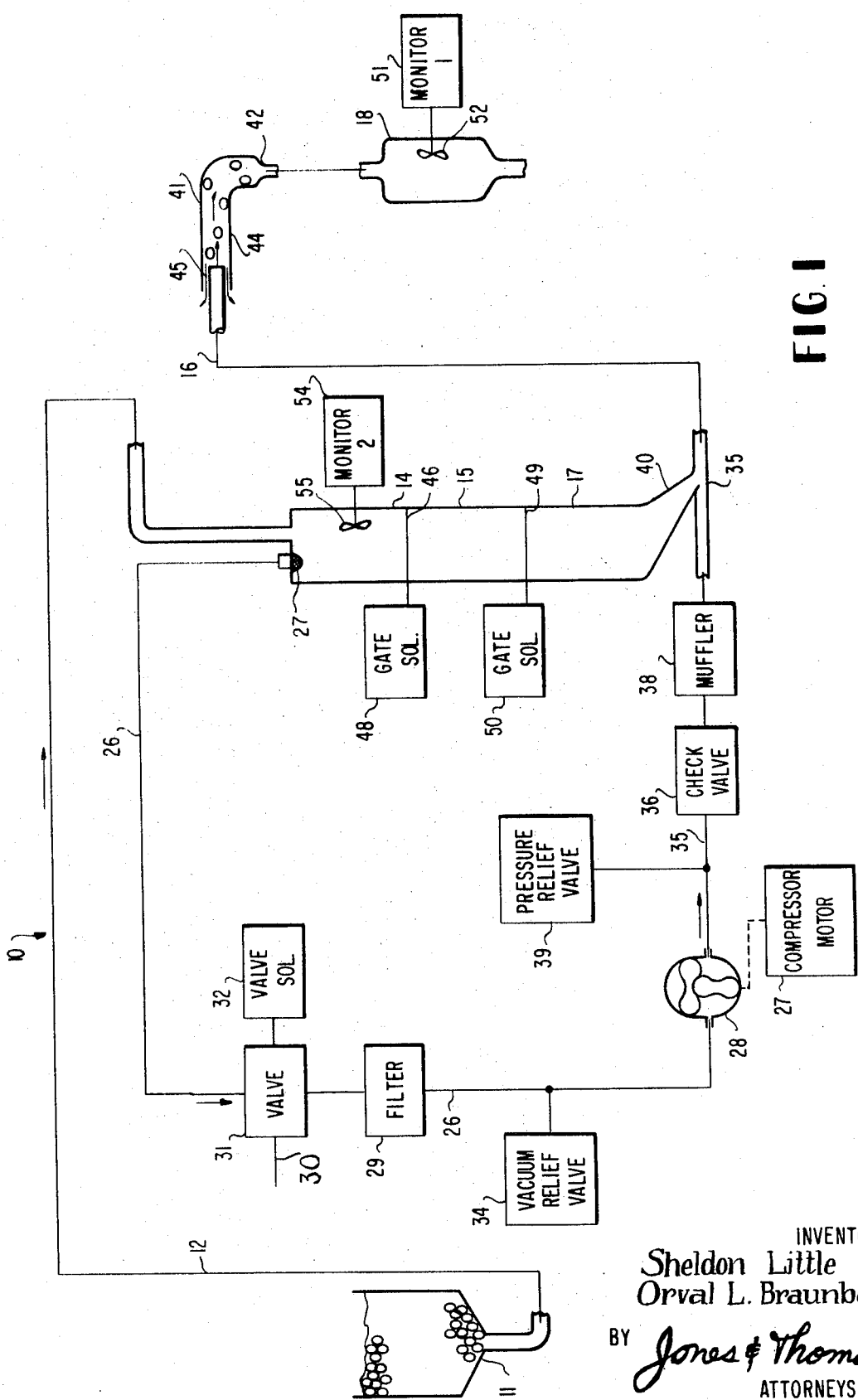
FIG. 1 is a schematic illustration of the pneumatic conveyor system.

Referring now in more detail to the drawing, wherein like numerals indicate like parts throughout the several views, FIG. 1 discloses pneumatic conveyor system 10 which includes crown storage bin 11, crown suction conduit 12, upper or first crown accumulation chamber 14, lower or second crown accumulation chamber 15, flow bin 17, crown delivery conduit 16, and crown hopper 18 at the capping station of the crown bottling conveyor (not shown).

Figure 2:
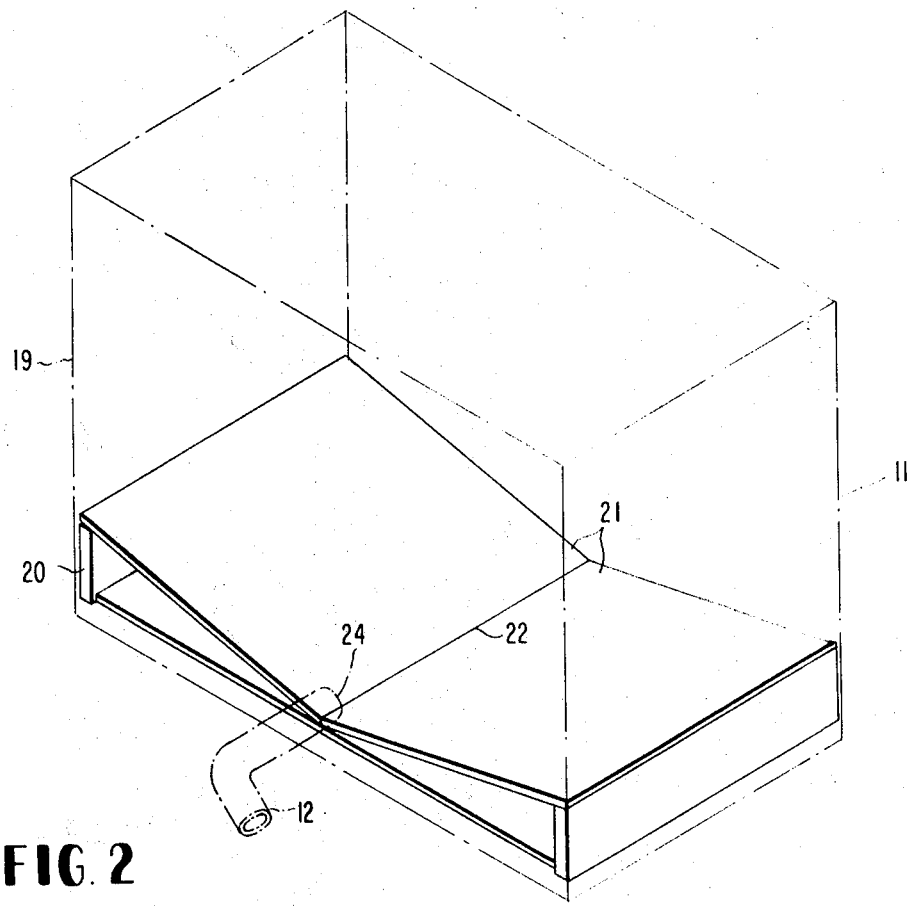
FIG. 2 is a perspective view of a crown storage bin, with parts shown in dashed lines to reveal the internal portion of the bin.

As is best shown in FIG. 2, crown storage bin 11 comprises a container 19 having a crown support platform or pallet 20 therein. Pallet 20 includes converging support surfaces 21 that form a center trough 22. An outlet opening 24 is defined in one or both of the sidewalls of container 19 in alignment with center trough 22. Crown suction conduit 12 is connectable to opening 24. The construction of crown storage bin 11 is such that the crowns stored therein will flow through outlet opening 24 into crown suction conduit 12, and as the crowns are removed from the lower portion of storage bin 11, the crowns in the upper portion of the storage bin will move in a downward direction to converging surfaces 21, and then toward center trough 22 so that only one outlet opening 24 is necessary to exhaust all of the crowns from the storage bin. Of course, pallet 20 can also be constructed so that its center trough slopes toward outlet opening 24 or the entire storage bin can be tilted if desired to further facilitate the removal of the crowns. Also, a workman can reach into storage bin and rake any remaining crowns at a remote portion of center trough 22 toward outlet opening 24 if all of the crowns have not been removed by the suction conduit.

Figure 3:
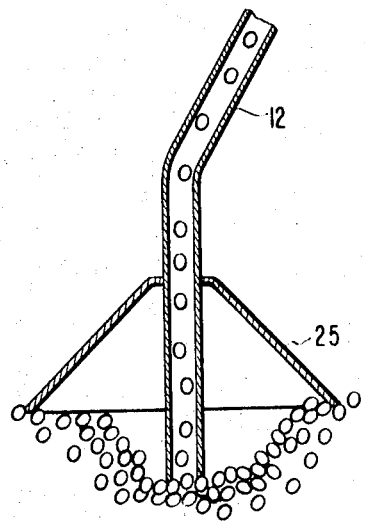
FIG. 3 is a detailed showing in cross section of an alternate form of the inlet portion of the conduit at the storage bin.

As is best shown in FIG. 3, an alternate method of removing the crowns from a crown storage bin is to suspend crown suction conduit 12 over the upper edge of a storage bin and allow the suction conduit to feed from the upper surface of the mass of crowns. To stabilize the inlet opening of crown suction conduit 12, a support hood 25 is connected thereto at a distance removed from the inlet opening, so that the inlet end of the suction conduit is maintained in an approximate upright attitude. As the crowns flow into the suction conduit, hood 25 will allow the inlet end of the suction conduit to move down with the level of the mass of crowns.

As is illustrated in FIG. 1, low-pressure air conduit or air suction conduit 26 is connected to the upper portion of upper crown accumulation chamber 14 and to the inlet side of positive displacement air compressor 28 through air filter 29 and bypass valve 31. A screen 27 is placed over the inlet of air suction conduit 26 in upper crown accumulation chamber 14. Bypass air suction conduit 30 also communicates with the inlet side of air compressor 28 through bypass valve 31, suction conduit 26 and filter 29. The opening of bypass conduit 30 is controlled by valve 31, which in turn is controlled by valve solenoid 32. When valve solenoid 32 is energized, the air flowing to the inlet side of air compressor 28 flows primarily from the atmosphere through bypass conduit 30. When solenoid 32 is deenergized the air flowing to the inlet side of air compressor 28 flows through air suction conduit 26, upper crown accumulation chamber 14 and crown suction conduit 12. Vacuum relief valve 34 communicates with air suction conduit 26 and functions bleed air to air suction conduit 26 from the atmosphere when the pressure at the inlet side of air compressor drops below a predetermined level.

High-pressure air conduit 35 communicates with the outlet of air compressor 28, the lower portion of flow bin 17, and terminates at crown hopper 18. Check valve 36 is positioned in high-pressure conduit 35 to assure that the flow through this conduit is always away from air compressor 28. Muffler 38 tends to reduce the noise of air compressor 28 and pressure relief valve 39 also communicates with high-pressure air conduit 35 and functions to relieve the pressure from air conduit 35 when the pressure exceeds a predetermined level.

Flow bin 17 includes an inclined spout 40 that communicates with high-pressure air conduit 35. Inclined spout 40 is extended toward the direction of airflow, and projects into air conduit 35 to create a Venturi effect in air conduit 35.

Crown delivery conduit 16 includes a deceleration chamber at its delivery end 42. Deceleration chamber 41 comprises a conduit section 44 having a diameter of approximately four times as large as the diameter of crown delivery conduit 16. Conduit section 44 is telescoped over the delivery conduit and an annular air exhaust passage way 45 is formed to allow a major portion of the airstream from crown delivery conduit 16 to exhaust itself in a direction generally opposite to the direction of the flowing crowns. As the crowns enter deceleration chamber 41, the motive air of airstream from delivery conduit 16 is dissipated and separated from the crowns, so that the crowns tend to be decelerated by the turbulent air within deceleration chamber 41. As the crowns approach the delivery end 42 of crown delivery conduit 16, they will be allowed to tumble in a downward direction toward crown hopper 18 on the bottling conveyor line.

Upper crown accumulation chamber 14 is separated from lower crown accumulation chamber 15 by means of upper transfer means 46, such as a gate which can be a sliding gate as illustrated and controlled by upper gate control solenoid 48, or which can be a hinged gate and controlled by an appropriate mechanism. In a similar arrangement, lower crown accumulation chamber 15 is separated from flow bin 17 by means of lower transfer means 49, illustrated as a sliding gate which is controlled by lower gate control solenoid 50. A first monitor or crown level indicator 51 is positioned in crown hopper 18 on the bottling conveyor line and comprises a motorized paddle wheel 52 that is rotated when the crowns delivered to crown hopper 18 do not cover the paddle wheel. When the crowns cover the paddle wheel, its rotation is inhibited, and an indication is received by its motor. In a similar arrangement, a second monitor or crown level indicator 54 with a paddle wheel 55 is connected to and monitors the quantity of crowns in upper crown accumulation chamber 14. Of course, monitors 51 and 54 can take various other forms, such as diaphragm, electric eye, sonic, etc.

ELECTRICAL CIRCUIT

Figure 4:
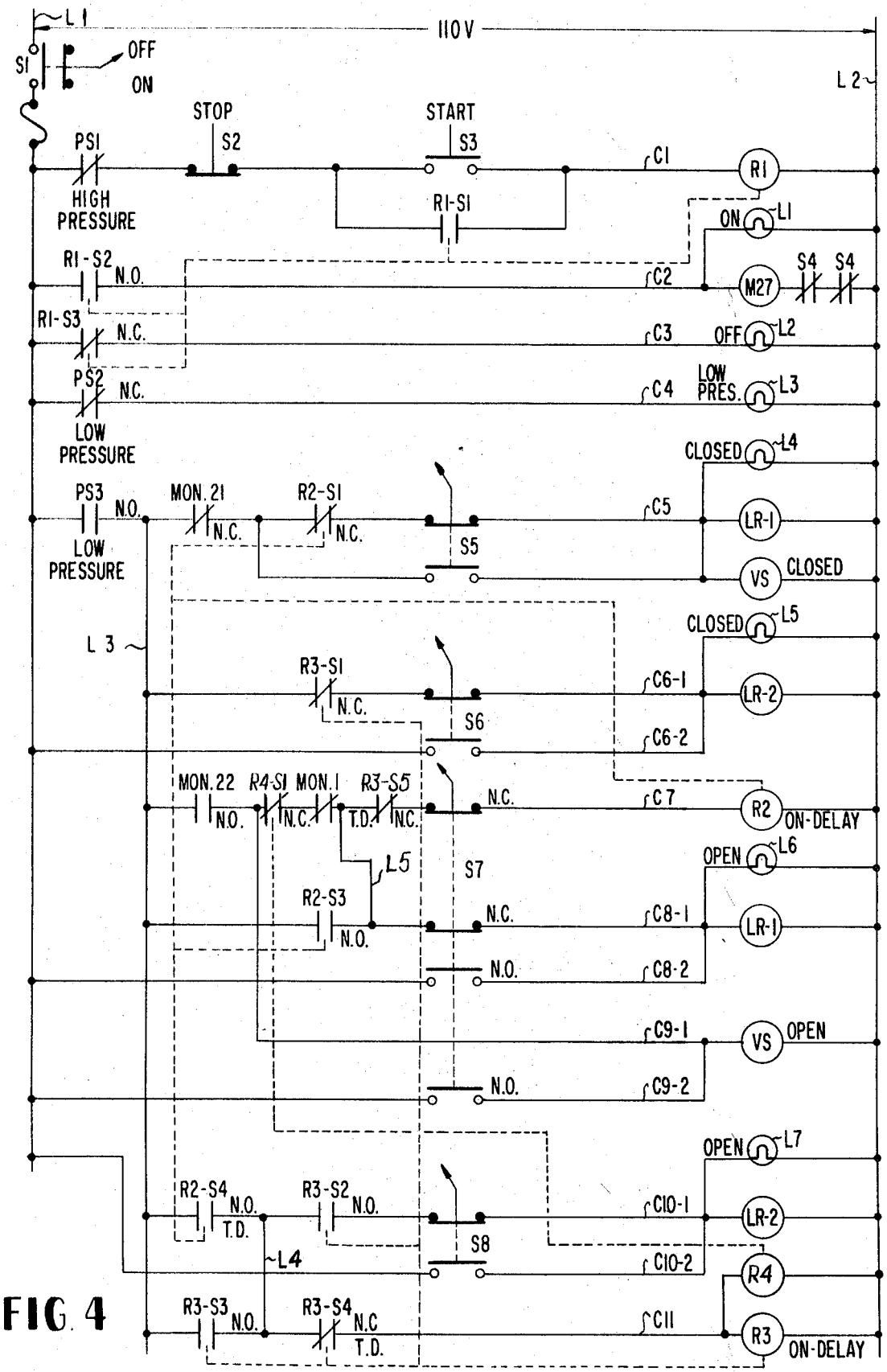
FIG. 4 is an electrical diagram of the control system utilized to operate the pneumatic conveyor.

As is illustrated in FIG. 4, the circuitry utilized to control the flow of crowns through pneumatic conveyor system 1 of FIG. 1 includes conductors L1 and L2, with the on-off switch S1 placed in conductor L1. Circuit C1 extends between conductors L1 and L2 and includes high-pressure switch PS1, stop switch S2, start switch S3, and relay R1. Switch R1-S1 is connected in parallel with start switch S3 and is responsive to relay R1 to form a holding circuit around start switch S3.

Circuit C2 includes normally open switch R1-S2, motor M27 and overload switches S4. Green indicator light L1 is connected in parallel with motor M27 and its overload switches. Switch R1-S2 is part of relay R1 in circuit 1 and is closed when relay R1 is energized. Circuit C3 includes normally closed switch R1-S3 and red indicating light L2. Normally closed switch R1-S3 is responsive to relay R1 and opens when relay R1 is energized. Circuit C4 includes normally closed low-pressure switch PS2 and amber indicating light L3. Low-pressure switch PS2 is responsive to the pressure in high-pressure conduit 35 (FIG. 1) and remains closed until the pressure in this conduit rises above a predetermined level and then functions to cut off amber indicating light L3.

Low-pressure switch PS3 is normally open and connects conductor L1 to conductor L3. Low-pressure switch PS3 is positioned in high-pressure conduit 35 (FIG. 1) and functions to close when the pressure in that conduit rises above a predetermined level. Circuit C5 includes a monitor switch MON-21 as illustrated in 54 in FIG. 1, normally closed switch R2-S1, selector switch S5, red indicating light L4, upper gate solenoid or latch relay LR-1, and valve solenoid VS. In FIG. 1 valve solenoid VS is indicated at 32 and latch relay LR-1 is indicated at 48. Monitor switch MON-21 is normally closed when its paddle wheel 55 (FIG. 1) is rotating. When the paddle wheel is stalled by the accumulation of crowns in upper crown accumulation chamber 14, monitor switch MON-21 opens.

Circuit C6-1 extends between conductors L3 and L2, while its alternate circuit C6-2 extends between conductors L1 and L2. Circuit C6-1 includes normally closed switch R3-S1, normally closed selector switch S6, gate solenoid or latch relay LR2 and red indicating light L5. Selector switch S6 causes latch relay LR2 and red indicating light L5 to be in series with low-pressure switch PS3 and switch R3-S1 or to exclude these switches.

Circuit C7 includes normally open monitor switch MON-22 for upper crown accumulation chamber 14, normally closed switch R4-S1, normally closed monitor switch MON-1 for crown hopper 18, normally open switch R3-S5, selector switch S7, and time delay relay R2. Circuit C8-1 is in series with low-pressure switch PS3 and includes normally open switch R2-S3, selector switch S7, green indicating light L6, and gate solenoid or latch relay LR1. Conductor L-5 connects together circuits C7 and C8-1, circuit C8-2 is connected between conductors L1 and L2 to bypass low-pressure switch PS3 and switch R2-S3 and includes selector switch S7, latch relay LR1 and green indicating light L6.

Circuit C9-1 joins circuit C7 and is placed in series with low-pressure switch PS3 and monitor switch MON-22, and includes valve switch VS which is indicated at 32 in FIG. 1. Circuit C9-2 is connected between conductors L1 and L2 to bypass low-pressure switch PS3 and monitor switch MON-22 and includes selector switch S7 and valve switch VS.

Circuit C10-1 is connected between conductors L3 and L2 and includes normally open switch R2-S4, normally open switch R3-S2, selector switch S8, lower gate solenoid or latch relay LR2, and green indicating light L7. Circuit C10-2 is connected between conductors L1 and L2 and includes selector switch S8, latch relay LR2 and indicating light L7, thus bypassing low-pressure switch PS3, switch R2-S4 and switch R3-S2.

Circuit C11 is connected between conductors L3 and L2 and includes normally open switch R3-S3, normally closed switch R3-S4, time delay relay R3 and instantaneous relay R4. Circuits C10-1 and C11 are joined by conductor L4.

OPERATION

When pneumatic conveyor system 10 is to be placed in operation, crown hopper 18 and upper crown accumulation chamber 14 are usually empty. The workman connects crown suction conduit 12 to the outlet opening 24 of a crown storage bin 11 (FIG. 2) and closes on-off switch S1 and start switch S3. This energizes relay R1 which functions to close switch R1-S2 in circuit C2 and to open switch R1-S3 in circuit C3. The closing of switch R1-S2 energizes motor M27 of air compressor 28, cuts on green indicating light L1, and the opening of switch R1-S3 cuts off red indicating light L2. Green indicating light L1 indicates the motor is in operation and air should be flowing to the system.

When amber indicating light L3 is on, it indicates that the pressure in high-pressure air conduit 35 is not sufficient to perform the desired function of the system. When air pressure from compressor 28 in high-pressure air conduit 35 rises above a predetermined level, normally closed low-pressure switch PS2 will open and cut off amber indicating light L3. Low-pressure switch PS3 is also closed by the increasing pressure in high-pressure conduit 35 and connects conductor L3 to conductor L1. Thus, low-pressure switch PS3 arms the various electrical components of the system that are connected between conductors L3 and L2 in response to the high-pressure condition in high-pressure conduit 35. Of course, low-pressure switch PS3 can be bypassed by selector switches S6, S7 and S8 when desired.

When the monitor 54 in upper crown accumulation chamber 14 is calling for crowns its switch MON-21 in circuit C5 will be closed and a circuit is made through low-pressure switch PS3, monitor switch MON-21, normally closed switch R2-S1, selector switch S5, and through valve solenoid VS, latch relay LR-1, and red indicating light L4. When latch relay LR-1 is energized in this manner, it functions to close upper sliding gate 46 (FIG. 1), and when valve solenoid VS is energized, it functions to close bypass valve 31 and the bypass suction conduit 30 (FIG. 1). This causes the inlet of air compressor 28 to communicate with upper crown accumulation chamber 14 and through crown suction conduit 12 to crown storage bin 11. Thus, a stream of air is created from crown storage bin 11 and will carry a supply of crowns to upper crown accumulation chamber 14 until the monitor 54 is satisfied or stalled by the level of crowns within the accumulation chamber, whereupon the normally closed switch MON-21 of the monitor is opened. The opening of switch MON-21 breaks the circuit to valve solenoid VS and causes the inlet of air compressor 28 to open to the atmosphere and bypass upper crown accumulation chamber 14, which terminates the stream of air from crown storage bin 11 to the accumulation chamber. Thus, no more crowns will be delivered to upper crown accumulation chamber 14 until its monitor 54 calls. While monitor switch MON-21 breaks the circuit to latch relay LR-1, upper sliding gate 46 will remain in its closed position to hold the crowns in upper crown accumulation chamber 14.

While upper crown accumulation chamber 14 was being filled, the monitor 51 in crown hopper 18 was calling for crowns, and its normally closed switch MON-1 in circuit C7 was closed since the monitor was not satisfied. When monitor 54 of upper crown accumulation chamber 14 is satisfied, its normally open switch MON-22 in circuit C7 is closed. The closed switches of the two monitors in circuit C7 make the circuit through switch R4-S1, switch R3-S5, selector switch S7, and through relay R-2.

When relay R-2 is energized in this manner, it opens normally closed switch R2-S1 in circuit C5, closes normally open switch R2-S3 in circuit C8-1, and closes normally open switch R2-S4 in circuit C10-1. The opening of switch R2-S1 in circuits C5 by relay R-2 assures that valve solenoid VS and latch relay LR-1 in circuit C5 will not become energized by monitor MON-2 in upper crown accumulation chamber 14 regardless of the position of switch MON-21. The closing of normally open switch R2-S3 by relay R2 in circuit C8-1 makes a circuit to latch relay LR-1 and green indicating light L6. When latch relay LR-1 is energized, it functions to open upper sliding gate 46 between upper and lower crown accumulation chambers 14 and 15 to drop the crowns to the lower chamber. In the meantime, the closing of switch R2-S4 in circuit C10-1 energizes relay R3 and relay R4 in circuit C11 through conductor L4 and normally closed switch R3-S4. When relay R4 is energized, it opens switch R4-S1 in circuit C7, and when relay R3 is energized, it functions to open normally closed switch R3-S1 in circuit C6-1, thus deenergizing latch relay LR-2. This functions to unlatch but not to open lower sliding gate 49 between lower crown accumulation chamber 15 and flow bin 17. Also, relay R3 begins to open its own circuit by actuating time delay switch R3-S4 in circuit C11. Moreover, switch R3-S3 in circuit C11 is closed by relay R3 which places a holding circuit around switch R2-S4 in circuit C10-1. Normally open switch R3-S3 is energized by relay R3 and closes after a time delay. Switch R2-S3 in circuit C8-1 is opened to break the circuit to latch relay LR-1 which functioned to open upper sliding gate 46, and switch R2-S1 in circuit C5 which was opened by relay R2 will again close to close the upper sliding gate. When switch R3-S2 in circuit C10-1 closes to energize latch relay LR-2, and lower sliding gate 49 opens to drop the crowns from lower crown accumulation chamber 15 into flow bin 17. When the time delay of switch R3-S4 in circuit C11 expires, relay R3 is deenergized, which functions to open normally open switch R3-S2 in circuit C10-1, to open the bypass switch R3-S3 in circuit C11, and to close switch R3-S1 in circuits C6-1. The closing of switch R3-S1 again actuates latch relay LR-2 to close lower sliding gate 49.

At this point, the cycle of operation of valve solenoid VS of bypass valve 31, latch relay R-1 of upper sliding gate 46, and latch LR-2 of lower sliding gate 49 are complete. The cycle of operation will continue until the monitor 51 in crown hopper 18 is satisfied by its level of crowns covering paddle 52 of the monitor. This causes the monitor switch MON-1 in circuit C-7 to be opened so that relay R2 will not function. Since relay R2 controls the opening of upper sliding gate 46 through the normally open switch R2-S3 and latch relay LR-1 in circuit C8-1, upper sliding gate 46 will not function to open and drop crowns until monitor 51 calls. In the meantime, if monitor 54 in upper crown accumulation chamber 14 is calling, it will fill upper crown accumulation chamber 14 until its switch MON-21 opens circuit C5. When monitor 54 is satisfied, bypass valve 31 will remain open so that the stream of air flowing from crown storage bin 11 is terminated.

It should be noted that the various selector switches S5, S6, S7 and S8 allow various ones of the components of the system to be bypassed, as may be desired when the system is not positioned in its automatic mode of operation. Under normal conditions, these switches will be placed in the positions as shown in the drawing and the system will function as described.

Because of the manner in which crown suction conduit 12 retrieves the individual crowns from the mass of crowns in the storage bin, the system is able to operate to intermittently draw the crowns into upper crown accumulation chamber 14. It should be noted that a mass of bottle crowns is a substantially porous mass of material and air can circulate rather freely through the mass. This allows a suction conduit to communicate directly into the mass and retrieve the individual crowns from the mass without fear of blockage or stoppage of the airstream, either through the mass of crowns or in the suction conduit. Of course, there are some instances when a mass of crowns will form an internal bridge of crowns in a storage area and will not fall under the influence of gravity in a downward direction to the supporting surfaces of the storage area; however, the gradual sloping or converging support surfaces of storage bin 11, and the horizontal center trough 22 are such that virtually no bridging occurs within the mass of crowns, as might occur in a steeply sloped funnel-shaped hopper or the like. Since the crowns are exhausted through a sidewall of the container 19, the flow of air must move the crowns in the lateral direction while the crowns tend to move in a downward direction under the influence of gravity. Thus, the flowing air functions to destroy any bridging of the crowns.

When the crowns are withdrawn from the storage bin from the top surface of the mass of crowns by the suction conduit illustrated in FIG. 3, the squirreling or creation of a recess or hole in the mass of crowns is inhibited by displacing the support hood 25 away from the inlet end of conduit 12. In this manner, the conduit is able to reach to a level so far below hood 25 that any hole formed by the inlet end of the conduit would tend to be destroyed by the upward movement of the flowing crowns and by the vibration of the conduit and its hood 25 against the mass of crowns.

Since upper sliding gate 46 and lower sliding gate 49 operate in sequence so that at least one of the gates is maintained closed there will be no flow of air through upper and lower crown accumulation chamber 14 and 15 and flow bin 17. The stream of air created from air compressor 28 beneath flow bin 17 in high-pressure conduit 35 is such that any crowns falling from flow bin 17 will be entrained in the stream of air and carried with the flow of air through crown delivery conduit 16. Thus, air compressor 28 is used to suck or induce the crowns through crown suction conduit 12 by the operation of bypass valve 31 and to blow the crowns from flow bin to crown hopper 18.

In the event that any debris of dust or trash or any other foreign matter is present in crown storage bin 11, by having been placed in the bin by the manufacturer or by having entered the bin at the bottling company, the airstream used to convey the crowns will tend to "wash" or blow the debris off the surfaces of the crowns as the crowns flow from the storage bin toward upper crown accumulation chamber 14. Since the airstream is separated from the crowns at upper crown accumulation chamber 14, the lighter dust, debris, etc. will tend to flow with the air and be carried through air suction conduit 26 to filter 29. Filter 29 functions to filter out these particles before the air is received in compressor 28. Of course, filter 29 also functions to filter the air which flows by bypass conduit 30. The air flowing away from air compressor 28 through high-pressure conduit 25 is substantially clean and the previously "washed" crowns received from flow bin 17 are also substantially clean, so that the crowns as received through the delivery end 42 of crown delivery conduit 16 will be substantially clean. Moreover, in the event that any debris, etc. should possibly be entrained in the stream of air and crowns flowing through crown delivery conduit 16, the air will again tend to separate the debris from the crowns as the stream of air is separated from the debris from the crowns and flowed in an opposite direction back through annular air exhaust passage way 45.

While this invention has been described in detail with particular reference to preferred embodiments thereof, it will be understood that variations and modifications can be effected within the spirit and scope of the invention as described hereinbefore. For example, the particular circuit disclosed can be modified by those skilled in the art to perform the identical or a similar function of the various system components.

We claim:

1. A method of conveying bottle crowns or the like from a storage container to a bottle-capping station or the like comprising flowing a stream of air from the storage container toward the bottle-capping station, introducing bottle crowns in the stream of air at the storage container, flowing the bottle crowns with the stream of air to a first accumulation chamber, holding the bottle crowns in the first accumulation chamber until a predetermined quantity of crowns has accumulated in the first accumulation chamber while the stream of air continues to flow toward the bottle-capping station, transferring the bottle crowns from the first accumulation chamber to a second accumulation chamber when the predetermined quantity of bottle crowns has been accumulated at the first accumulation chamber, introducing the bottle crowns back into the stream of air from the second accumulation chamber, flowing the bottle crowns with the stream of air from the second accumulation chamber toward the bottle-capping station, separating a major portion of the stream of air from the bottle crowns before the bottle crowns reach the bottle-capping station, and continuing the flow of bottle crowns to the bottle-capping station.

2. The invention of claim 1, and further including the step of bypassing the stream of air about the storage container when a predetermined quantity of bottle crowns are accumulated at the bottle-capping station.

3. The invention of claim 1, and further including the step of filtering the stream of air after it emerges from the first accumulation chamber and before the bottle crowns are introduced back into the stream of air from the second accumulation chamber.

4. The invention of claim 1, and wherein the step of introducing the bottle crowns to the stream of air from the storage container comprises moving the bottle crowns in a downward direction under the influence of gravity within the storage container and into the stream of air at the bottom of the storage container.

5. A flow system for conveying bottle crowns or the like to a bottle-capping station or the like comprising conduit means for communication at its entry end with a bottle crown storage container and for communication at its delivery end with a bottle-capping station, pump means connected to said conduit means intermediate its entry end and its delivery end and arranged to flow a stream of air through said conduit means from its entry end to its delivery end, a first bottle crown accumulation chamber communicating with said conduit means upstream of said pump means for accumulating bottle crowns from the portion of said conduit means upstream of said pump means, a second bottle crown accumulation chamber, first transfer means for transferring the bottle crowns from said first accumulation chamber to said second accumulation chamber, second transfer means for flowing the bottle crowns from said second accumulation chamber into the portion of said conduit means downstream from said pump means, means for exhausting air from said conduit means upstream of said delivery end of said conduit means and for decelerating the bottle crowns as the bottle crowns approach the bottle-capping station.

6. The invention of claim 5, and wherein said first accumulation chamber is positioned above said second accumulation chamber, and said second accumulation chamber, and said second accumulation chamber is positioned above the portion of said conduit means downstream from said pump means whereby the bottle crowns flow under the influence of gravity from first accumulation chamber to said second accumulation chamber and from said second accumulation chamber to the portion of said conduit downstream from said pump means, and further including control means for sequentially operating said first and second transfer means.

7. The invention of claim 5, and wherein a storage container is provided with a bottle crown egress opening at its lower portion, and with said storage container including bottom walls sloped downwardly toward said egress opening.

8. The invention of claim 5, and wherein the entry end of said conduit means includes support means constructed and arranged to support the entry end of said conduit on the surface of a mass of bottle crowns.

* * * * *